Figure 1:
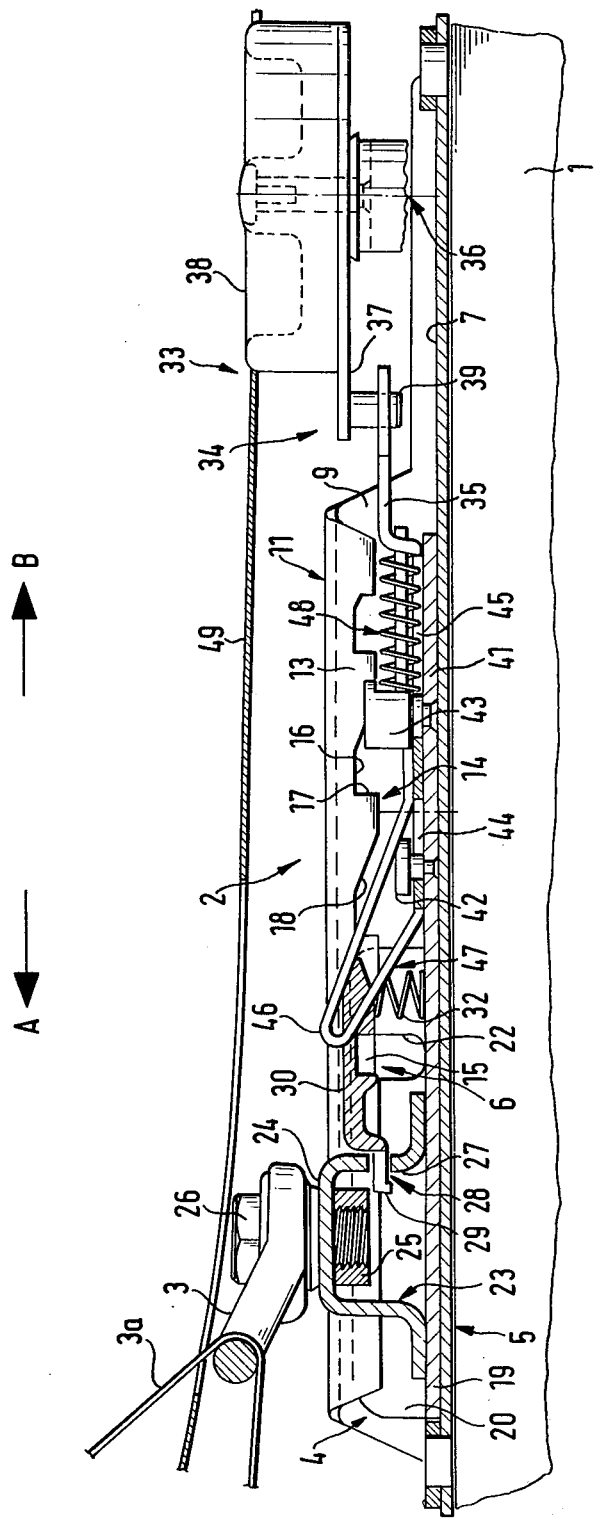

United States Patent [19]

Hipp et al.

[11] 4,453,741

[45] Jun. 12, 1984

[54] DEVICE FOR HEIGHT ADJUSTMENT OF A REVERSING MOUNT FOR THE SHOULDER BELT

[75] Inventors: Karl H. Hipp; Anton Detsch, both of Munich, Fed. Rep. of Germany

[73] Assignee: Bayerische Motoren Werke A.G., Fed. Rep. of Germany

[21] Appl. No.: 291,478

[22] Filed: Aug. 10, 1981

[30] Foreign Application Priority Data

Aug. 9, 1980 [DE] Fed. Rep. of Germany ....... 3030209

[51] Int. Cl.³ ............................................. B60R 21/00
[52] U.S. Cl. .................................... 280/801; 280/808; 297/410
[58] Field of Search ....................... 280/801, 802, 808; 297/410, 483

[56] References Cited

U.S. PATENT DOCUMENTS

| 3,964,798 | 6/1976 | Burleigh | 280/808 |
| 4,159,848 | 7/1979 | Manz | 297/483 |
| 4,225,185 | 9/1980 | Krzok | 280/801 |
| 4,311,323 | 1/1982 | Provensal | 280/801 |

FOREIGN PATENT DOCUMENTS

| 1964123 | 7/1971 | Fed. Rep. of Germany . | |
| 2039103 | 2/1972 | Fed. Rep. of Germany | 280/801 |
| 2460092 | 6/1976 | Fed. Rep. of Germany | 280/808 |
| 1367248 | 9/1974 | United Kingdom . | |
| 1486974 | 9/1977 | United Kingdom . | |

Primary Examiner—Bruce H. Stoner, Jr.
Assistant Examiner—John A. Carroll
Attorney, Agent, or Firm—Craig & Burns

[57] ABSTRACT

A device is disclosed for adjusting the height of a reversing mount of a shoulder belt of a restraining system disposed on a vehicle body in the vicinity of the shoulder of a passenger. The device comprises a slide guide fixedly associated with the vehicle body for receiving an adjusting element, an adjusting element positioned on the slide guide and supporting a reversing mount. The adjusting element supports an elastically supported latch. The latch automatically engages latching positions provided on the slide guide and is automatically brought out of the latching positions by deflecting ramps provided on the slide guide when the adjusting element is adjusted upward. The device further includes an actuating mechanism for adjusting the height of the adjusting element upward and downward. The actuating mechanism comprises a drive and a slide which is connected with the drive and is movably guided on the adjusting element relative to the latch. The slide includes a first driver which engages the adjusting element during an upward adjustment and a second driver having a surface in the form of an inclined plane which engages the latch when making a downward adjustment to disengage the latch from the latching positions by relative movement of the slide and adjusting element.

9 Claims, 3 Drawing Figures

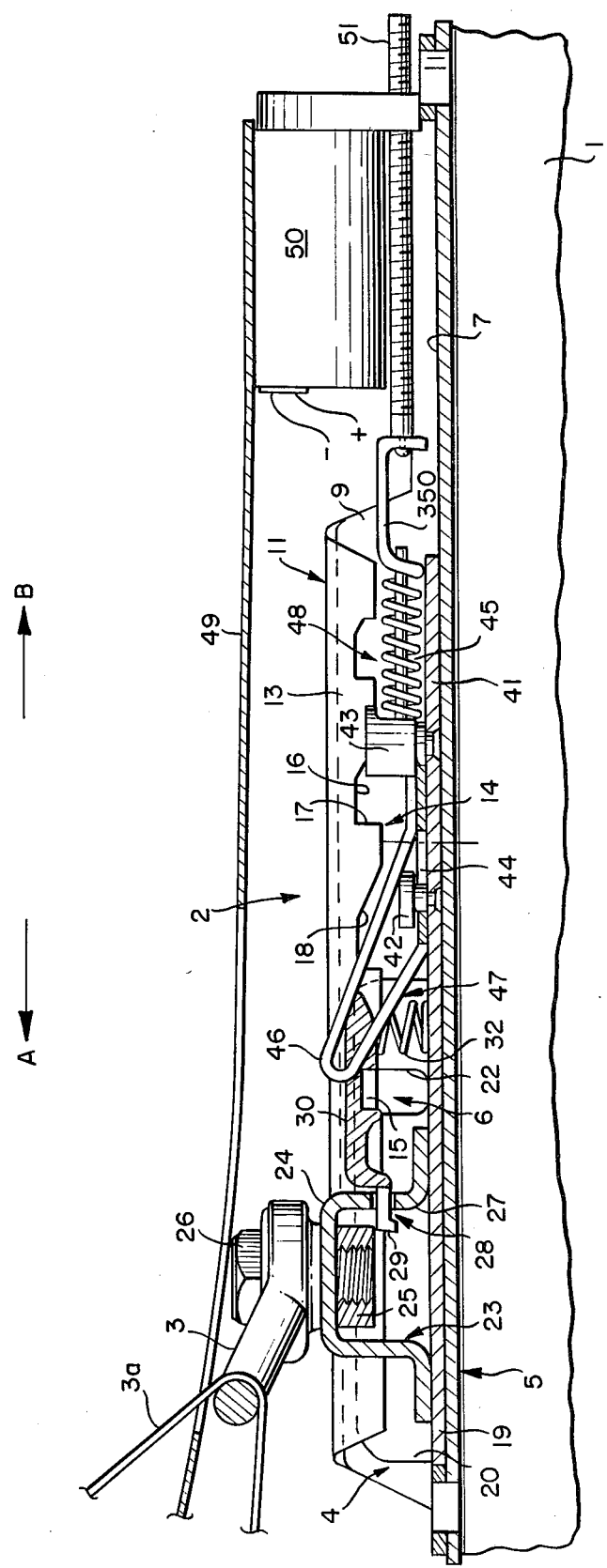

DEVICE FOR HEIGHT ADJUSTMENT OF A REVERSING MOUNT FOR THE SHOULDER BELT

The present invention is directed to a device for adjusting the height of a reversing mount for a shoulder belt of a restraining system disposed on a vehicle body in the vicinity of the shoulder of the passenger. In particular, the present invention is directed to an improvement of a device of the aforementioned type as disclosed in the commonly owned U.S. Pat. No. 4,398,749, issued Aug. 16, 1983, the disclosure of which is incorporated herein by reference.

More specifically, the device of the present invention is a device for adjusting a belt mount, the mount being disposed on an adjusting element displaceable in a slide guide, permanently mounted on the vehicle body. A lock operates between the slide guide and the adjusting element, the latch of the lock automatically engaging in latching positions and also automatically releasing from the latching positions to permit simple and convenient adjustment of the device when the reversing mount is displaced in a direction opposite to the direction in which the belt is stressed, i.e., upward or higher.

In the aforementioned copending application, when the belt is adjusted in the direction in which the belt is stressed, i.e., downward or lower, the latch is disengaged from the corresponding locking position by a manually operated pushbutton. This pushbutton, provided to overcome the locking action, is an actuating device, simple in design and inexpensive to manufacture, located on the belt mount height adjustment device.

The object of the present invention is to equip a device of the aforementioned type for adjusting the height of a reversing mount for the shoulder belt with an actuating device which provides improved ease of operation.

This object is attained according to the present invention by providing a device of the aforementioned type with an actuating means for adjusting the height of the adjusting element upward and downward. The actuating means comprises a drive means and a slide which is connected with the drive means and is movably guided on the adjusting element relative to the latch. The slide includes a first driver which engages the adjusting element during an upward adjustment and a second driver having a surface in the form of an inclined plane which engages the latch when making a downward adjustment to disengage the latch from the latching positions by relative movement of the slide and adjusting element. The drive means for the slide can be actuated either manually or by means of a motor, depending on the installation conditions, production costs, and the nature of operation.

In a disclosed preferred embodiment of the present invention the drive means is connected with the slide by a drive coupling in the form of a Scotch-yoke drive coupling. The drive means includes a manually operable rotatable knob and the drive coupling includes a crank non-rotatably connected with the knob and engaging the slide.

The adjusting element of the device according to the invention is provided with two pins which are received in sliding engagement in elongated holes formed in the slide. One end of an elongated hole serves as the first driver to engage the corresponding pin of the adjusting element during an upward adjustment.

According to a further feature of the present invention the second driver of the slide is formed by two loops formed in lateral areas on the slide, the loops having inclined planar sliding surfaces which engage the latch when making a downward adjustment.

These and other objects, features and advantages of the present invention will become more apparent from the following description when taken in connection with the accompanying drawings which show, for purposes of illustration only, two embodiments in accordance with the present invention.

Figure 2:
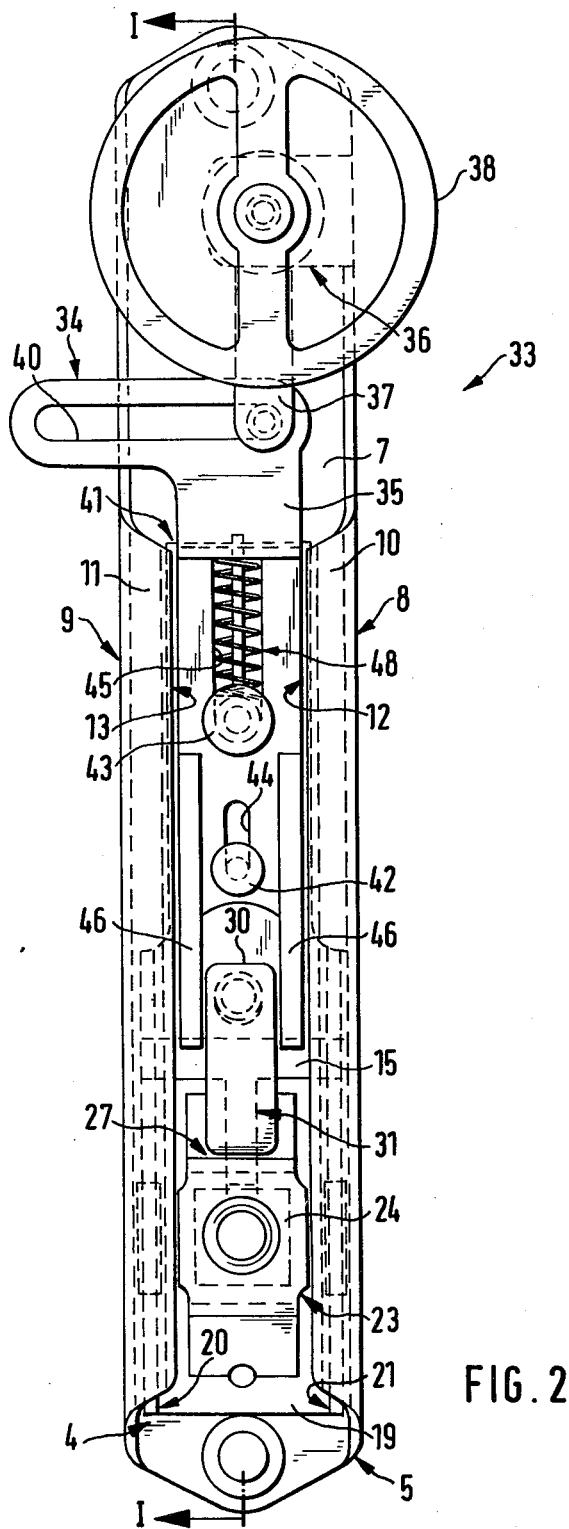

FIG. 1 is a cross sectional view of a device for a height adjustment of a belt mount according to the present invention taken along the line 1—1 in FIG. 2; and FIG. 2 is a top view of the device for height adjustment of a belt mount according to the present invention; and FIG. 3 is a cross sectional view, similar to FIG. 1, of a second embodiment of a device for a height adjustment of a belt.

FIG. 1 shows a device 2, fastened on the B column 1 of an automobile, not shown in greater detail, for height adjustment of a reversing mount 3, disposed in the shoulder area of a vehicle passenger, for an automatic belt 3a. Device 2 comprises an adjuting element 4 which supports reversing mount 3. The element 4 is displaceably mounted in a slide guide 5 fixedly associated with the vehicle body, and is locked at the appropriate height by an automatically acting latch 6.

Slide guide 5 is a track 7, essentially U-shaped in cross section, whose legs 8 and 9 are turned inward somewhat in the manner of the letter C in the vicinity of their free ends. C-profiles 10 and 11, with their free end segments, form strips 12 and 13 running parallel at a distance from each other. The strips each have teeth 14.

The spaces between the teeth in toothed strips 12 and 13 form locking points 16 on device 2 for latch 15 of lock 6. Each locking position 16 comprises, on the one hand, a locking area 17 which is essentially perpendicular to the direction of displacement of adjusting element 4 and, on the other hand, an inclined deflecting ramp 18. Thus, locking positions 16 on each strip 12 and 13 each have teeth 14 presenting a saw-tooth profile.

Adjusting element 4 comprises a slide 19, U-shaped in cross section, the free ends of whose legs 20, 21 engage C-profiles 10 and 11 of slide guide 5. Guide slots 22 are disposed in both legs 20 and 21, with locking positions 16 or tooth gaps in strips 12 and 13 located opposite one another, to accept latch 15, which is located transversely with respect to toothed strips 12 and 13.

Slide 19 has a yoke 23, approximately hat-shaped in cross section, with a welding nut 25 mounted on a rib 24 for mounting bolts 26 of reversing mount 3. Yoke 23 has an opening 28 on its leg 27 to accept, with pivoting motion, a tongue 29 on a tab 30. Tongue 29 is formed from a projection, extending beyond tab 30, of a T-shaped element 31, firmly connected to tab 30, made of metal, whose extensions, projecting laterally beyond tab 30, form latch 15. A compression spring 32, mounted in a tensioned fashion, engages the free end of tab 30. The spring serves to hold latch 15 automatically in the corresponding locking position 16 or tooth gap.

To adjust reversing mount 3 in one of the directions indicated by arrows A and B, device 2 is equipped with an actuating device 33 comprising a Scotch-yoke mechanism 34. This mechanism 34 consists of a Scotch-yoke 35 and a crank 37, mounted to be rotationally movable on track 7 at 36, the crank being nonrotatably connected with a manually operated rotating knob 38. Crank 37 has a pin 39 that engages a guide track 40, the track being formed in a trimmed end segment of a cross slide formed in the Scotch-yoke 35.

Adjusting element 4 or slide 19 is provided on the drive side with a projection 41 to accept, with sliding movement, cross slide 35, which is movably guided on slide 19 relative to latch 15. Pins 42 and 43 are mounted on projection 41 to guide cross slide 35 on slide 19, for sliding engagement in elongated holes 44 and 45 on cross slide 35.

Cross slide 35, at the other end segment which faces latch 15, comprises two loops 46, formed in its lateral areas. Loops 46 are directed transversely with respect to latch 15 and have sliding surfaces 47 disposed in the manner of an inclined plane. Loops 46 have their sliding surfaces 47 held a slight distance apart by a pretensioned compression spring 48 located between the cross slide 35 and slide 19, when the device 2 is not actuated, i.e., in the neutral position, by latch 15. Here cross slide 35 strikes against one of pins 42 or 43 with one end of one of elongated holes 44 or 45.

To adjust the reversing mount 3 downward as shown by arrow A, cross slide 35 is moved in the direction of arrow A by using knob 38. Before the actual adjustment of the slide 19, which supports reversing mount 3 and is locked by latch 15, cross slide 35 is displaced relative to slide 19 and hence also relative to latch 15. The relative movement of cross slide 35 causes latch 15 to be disengaged from the corresponding latching position 16 or tooth gap by the inclined sliding surfaces 47 on loops 46. Since compression spring 48 is designed to be relatively weak, latch 15 is held in the disengaged position during the process of adjustment of slide 19 by loops 46, whereby loops 46 serve as drivers for adjustment downward. It is only later in the adjustment process that loops 46 and latch 15 are separated from one another by compression spring 48, which relaxes, so that latch 15 can automatically engage the next latching position 16 or tooth gap under the influence of its compression spring 32.

When adjusting reversing mount 3 or slide 19 upward, as shown by arrow B, latch 15 is forced out of latching positions 16 or tooth gaps by the inclined deflecting ramps 18 of the corresponding latching positions 16 or tooth gaps against the action of compression spring 32, thus automatically overcoming the latching action of latch 6.

When the deflecting mount 3 is adjusted upward, cross slide 35 strikes one of pins 42 or 43 with one end of one of elongated holes 44 or 45, so that the corresponding pin 42 or 43 simultaneously serves as a driver for upward adjustment.

Improved ease of operation is provided by rotating knob 38, disposed on device 2 in a fixed position beneath a cover 49 on B-column 1, for height adjustment of reversing mount 3, as compared to the pushbutton, movable along with the adjusting element, which is shown on the device in the above-mentioned copending application.

It is also possible within the scope of the invention to, as seen in FIG. 3, connect the slide 350, movably guided on the adjusting element relative to the latch, with a motor drive. Instead of the prescribed manual drive, a pneumatically, hydraulically, or electrically driven stepping motor 50 can be provided as a drive. Preferably, the electrical stepping motor 50 can be equipped with a threaded spindle 51, which takes up only a small amount of space, for adjusting the slide 350 or adjusting element 4.

While we have shown and described only one embodiment in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

We claim:

1. A device for selectively adjusting a reversing mount for a shoulder belt of a restraining system disposed on a vehicle body upward and downward in the vicinity of the shoulder of a passenger, said device comprising a slide guide having discrete latching positions and deflecting ramp means fixedly associated with the vehicle body for receiving an adjusting element, an adjusting element associated with said slide guide and supporting the reversing mount, said adjusting element includes an elastically supported latch means for automatically engaging the latching positions provided on the slide guide and adapted to be automatically brought out of the latching positions by the deflecting ramp means provided on said slide guide when the adjusting element is adjusted upward, and actuating means including a drive means and a slide which is connected with the drive means and is movably guided on said adjusting element relative to the latch means for selectively adjusting the adjusting means upward and downward, said slide including a first driver which engages the adjusting element during an upward adjustment and a second driver having a surface in the form of an inclined plane which engages the latch means when making a downward adjustment to disengage the latch means from the latching positions by relative movement of the slide and adjusting element.

2. A device according to claim 1, wherein the drive means is connected with said slide by a drive coupling.

3. A device according to claim 2, wherein said drive coupling is a Scotch-yoke drive coupling, and wherein said drive means includes a manually operable rotating knob, said drive coupling including a crank non-rotatably connected with said knob and engaging said slide.

4. A device according to claim 1, wherein at least a part of said adjusting element has a U-shaped cross section with guide slots for the latch being located opposite one another in the legs of the U-shaped section.

5. A device according to claim 1, wherein said adjusting element is provided with at least one pin which is received in sliding engagement in an elongated hole formed in said slide, one end of said elongated hole serving as said first driver to engage said pin of the adjusting element during an upward adjustment.

6. A device according to claim 1 or 5, wherein said slide is provided with at least one loop which serves as said second driver to engage the latch when making a downward adjustment.

7. A device according to claim 6, wherein said second driver includes two loops formed in lateral areas of said slide, each of said loops having a surface in the form of an inclined plane which engage said latch means when making a downward adjustment.

8. A device according to claim 7, wherein said side is held in a neutral position by a spring which is pretensioned and located between said slide and said adjusting element.

9. A device according to claim 1, wherein said drive means includes a motor for adjusting the slide upward or downward.

* * * * *